United States Patent

Takamatsu

[11] Patent Number: 5,822,099
[45] Date of Patent: Oct. 13, 1998

[54] LIGHT COMMUNICATION SYSTEM

[75] Inventor: Hiroyuki Takamatsu, Kanagawa, Japan

[73] Assignee: Sony Corporation, Tokyo, Japan

[21] Appl. No.: 701,982

[22] Filed: Aug. 23, 1996

[30] Foreign Application Priority Data

Aug. 31, 1995 [JP] Japan ................................ 7-224071
Aug. 31, 1995 [JP] Japan ................................ 7-224077

[51] Int. Cl.$^6$ ............................................... H04B 10/00
[52] U.S. Cl. ..................... 359/153; 359/110; 359/143; 359/152; 359/187
[58] Field of Search ............................ 359/143, 110, 359/152, 153, 159, 161, 171–172, 177, 187; 455/24

[56] References Cited

U.S. PATENT DOCUMENTS

| 4,553,268 | 11/1985 | Tilly | 359/152 |
| 5,623,355 | 4/1997 | Olsen | 359/110 |

FOREIGN PATENT DOCUMENTS

| A 0159533 | 7/1987 | Japan | 359/152 |

*Primary Examiner*—Kinfe-Michael Negash
*Attorney, Agent, or Firm*—Frommer Lawrence & Haug LLP; William S. Frommer

[57] ABSTRACT

A light communication system employing light, such as infrared rays, in which power consumption required for light communication is diminished for prolonging the service life of portable equipments and for reducing interference or obstruction affecting other spatial light communication operations. A light emitting element 17 in a transmission portion 13 of a first transmission/reception device 10 is controlled in light emission by a light emission driving control circuit 12 and has its light emission intensity adjusted by a light emission intensity adjustment circuit 18 in a light emission drive control circuit 12. The light reception intensity in a light receiving element 27 of a receiving portion 24 of a second transmission/reception device 20 is detected by a reception light intensity detection circuit 28 in a light signal reception processing circuit 25 and sent via a transmission driving control circuit 22 and a transmitting portion 23 so as to be received by a reception portion 14 of the first transmission/reception device 10. The reception light intensity information is taken out by a reception processing circuit 15 and supplied to the light emission intensity adjustment circuit 18. The light emission intensity adjustment circuit 18 is responsive to the reception light intensity information to adjust the light emitting element 17 to a light emission intensity which is of a necessary minimum value to permit stable light communication.

14 Claims, 7 Drawing Sheets

LIGHT COMMUNICATION SYSTEM

FIELD OF THE INVENTION

This invention relates to a light communication system employing e.g., infrared rays. More particularly, it relates to a spatial light communication system for communication by emission of a light beam, such as infrared rays, to an areal space from one of a pair of transmitting/receiving apparatus to the other.

BACKGROUND OF THE INVENTION

In spatial light communication, employing e.g., infrared rays, the possible long-distance communication area is set over as broad a range as possible under assumed use conditions, and the light emitting element for light transmission is set to an intensity sufficient to cover the possible communication area.

In an infrared remote controller for unidirectional transmission (remote controller), the driving current for light emission is pre-set so that the light emitting intensity of a infrared light emitting diode provided on the remote controller will be of such a value as to positively control a usual controlled device provided in a room. Moreover, the directivity of the remote controller is set so as to be broad enough to facilitate the remote-controlling operation.

Such light communication, employing e.g., infrared light rays, has merits such that it is high in the degree of freedom because of a smaller amount of regulations than in communication by electrical waves, that it is superior in data security since transmission/reception occurs only in a range of view of the communicating parties and hence there is no risk of signal leakage to outside, and that the transmission/reception unit may be constructed at a lower cost than in the case of communication by electrical waves. In this consideration, it may be envisaged to use spatial light communication by infrared rays not only for unidirectional spatial light communication, as in the case of the communication by the above-mentioned remote controller by infrared rays, but also for bi-directional light communication such as between computers installed within rooms or between a computer and a peripheral equipment.

In the case of the spatial light communication having fixed light emission intensity, actual communication occurs in many cases over s distance shorter than the above-mentioned possible communication range, such that the energy inherently unnecessary for communication is consumed. This has a drawback that, in the case of a battery-driven portable light communication apparatus, the battery life tends to be shortened. There is also a risk that, in case of using plural light communication units, interference or obstruction of another spatial light communication going on in a near-by area tends to be produced.

Moreover, the light emission unit, such as infrared light emitting diode, is required to have directivity which will permit communication over a certain angular range. The result is that signal light is emitted in a direction for which there is no counterpart of communication. This energy represents an energy inherently unnecessary for spatial light communication. Moreover, such energy has the risk of affecting another spatial light communication going on in near-by areas, such as other spatial light communication transmission/reception units disposed in rooms, by interference or obstruction.

SUMMARY OF THE INVENTION

It is therefore an object of the present invention to provide a light communication system in which the light emission intensity of the light emitting elements for light communication is adjusted to a value required for communication for saving in power and for effectively prohibiting communication obstructions effectively.

It is another object of the present invention to provide a light communication system capable of reducing power consumption.

In one aspect, the present invention provides a light communication system having light emission means in a transmission portion of a first transmission/reception unit and light receiving means in a reception portion of a second transmission/reception unit. The second transmission/reception unit detects the reception light intensity of the light receiving means to transmit the received light intensity information to the first transmission/reception unit, while the first transmission/reception unit is responsive to the reception light intensity information to adjust the light emission intensity of the light emission means. Thus it becomes possible to adjust the light emission intensity depending on the state of light communication going on actually thereby saving the energy required for communication for prolonging the service life of a battery in case of a battery for a portable equipment. In addition, interference or obstruction in spatial light communication may be diminished for increasing the number of spatial light communication operations possible within a limited space.

In another aspect, the present invention provides a light communication system having variable directivity light emission means in the first transmission/reception unit and light receiving means for receiving a light signal in the second transmission/reception unit. The second transmission/reception unit detects the reception light intensity of the light reception means for sending the information concerning the reception light intensity to the first transmission/reception unit. The first transmission/reception unit is responsive to the information concerning the reception light intensity from the second transmission/reception unit for variably controlling directivity of the variable directivity light emission means. Thus it becomes possible to limit directivity to that required for spatial light communication to reduce power consumption and to decrease interference or obstruction affecting other spatial light communication operations while maintaining comprehensive directivity not affecting positioning of the variable directivity light emission means.

It is preferred to use light for transmission of the reception light intensity information, while it is also preferred to adjust the light emission intensity of the light emission means to a minimum value necessary for effecting stable communication.

DESCRIPTION OF THE PREFERRED EMBODIMENTS

Figure 1:
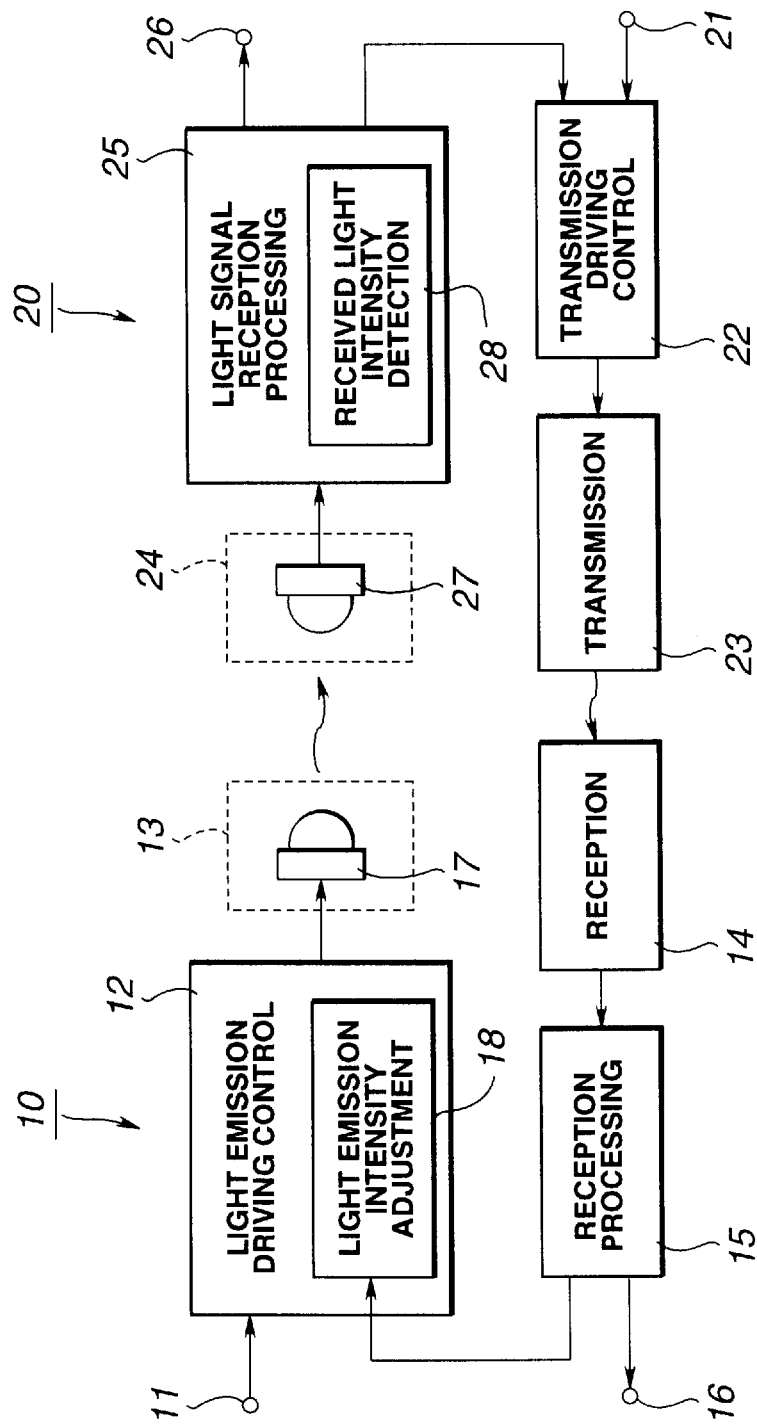
FIG. 1 schematically illustrates a light communication system according to an embodiment of the present invention.
Figure 2:
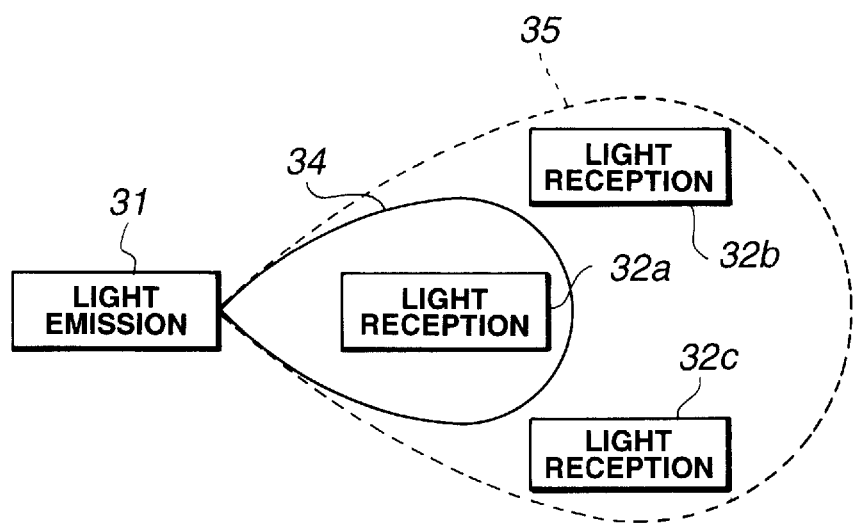
FIG. 2 illustrates the signal reaching range in spatial light communication with the light emission intensity being changed.

FIG. 1 shows, in a block diagram, an embodiment of a light communication system according to the present invention.

Referring to FIG. 1, a first transmission/reception unit 10 includes a light emission drive control circuit 12 for causing transmission of a communication signal supplied to an input terminal 11 and a transmission unit 13 supplied with a driving control signal from the light emitting drive control circuit 12. The first transmission/reception unit 10 also includes a reception unit 14 for receiving the communication from outside and a reception processing circuit 15 for reception processing of signals from the reception unit 14. The reception signals from the reception processing circuit 15 are taken out via an output terminal 16. The transmission unit 13 of the transmission/reception unit 10 has light emitting means, such as an infrared emitting diode, which emits light responsive to the signal from the light emitting drive control circuit 12.

The second transmission/reception circuit 20 of FIG. 1 includes a transmission drive control circuit 22 for causing transmission driving control of a communication signal supplied to an input terminal 21 and a transmission unit 23 supplied with a driving control signal from the transmission drive control circuit 22. The second transmission/reception circuit 20 also includes a light receiving element 27 constituting a light reception unit 24 designed to receive the light, such as infrared light, of spatial light communication from the light emitting element 17 of the first transmission/ reception unit 10, and a light signal reception processing circuit 25 for reception processing of the light signal from the light receiving element 27 of the reception unit 27. The reception signal from the light signal reception processing circuit 25 is taken out at an output terminal 26.

Within the light signal reception processing circuit 25 of the second transmission/reception unit 20 of FIG. 1, there is provided a reception light intensity detection circuit 28 for detecting the intensity of light received by the light receiving element 27 of the reception unit 24. The reception light intensity information detected by the reception light intensity detection circuit 28 is sent to the transmission driving control circuit 22 and sent to the transmission unit 23 as the transmission driving signal along with the communication signal from the input terminal 21. The transmission unit 23 transmits signals, such as electrical waves, infrared rays or similar signals to the reception unit 14 of the first transmission/reception unit 10. It is noted that, although communication between the transmission unit 23 of the second transmission/reception unit 20 and the reception unit 14 of the first transmission/reception unit 10 may be by electrical weaves, infrared light rays or in any other form, spatial light communication with light, such as infrared light rays, is most preferred. Of the reception information obtained on signal reception by the reception unit 14 of the first transmission/reception unit 10 and on signal processing by the reception processing circuit 15, the reception light intensity information is sent to the light transmission intensity adjustment circuit 18 within the light emission driving control circuit 15. The light transmission intensity adjustment circuit 18 variably adjusts the light emission intensity of the light emitting element 17 of the transmission unit 13.

In carrying out light communication, the light emission intensity adjustment circuit 18 within the light emission driving control circuit 12 of the first transmission/reception unit 10 causes the light emission element 17 to emit light with the maximum light emission intensity to start communication. The light transmission intensity adjustment circuit 18 variably adjusts the light emission intensity for achieving the minimum light emission intensity assuring stable communication responsive to the reception light intensity information from the second transmission/reception unit 20 as a counterpart of communication. In this case, the light intensity is weakened from the maximum light emission intensity during communication. Alternatively, the light intensity may be strengthened from the minimum light emission intensity, or the light intensity may be varied from a mid light emission intensity.

If the relative position between the first light transmission/ reception unit 10 and the second light transmission/reception unit 20 is fixed, it suffices if the light emission intensity be adjusted at the outset to an optimum value, while it is unnecessary to re-adjust the light emission intensity each time communication is started.

Such adjustment of light emission intensity has the following merits:

If communication is to be had between a transmission/reception unit 31 having the light emission element for transmission and a transmission/reception unit 32a having a light reception element and the light emission intensity of the light emission element of the transmission/reception unit 31 is maximum, there are three transmission/reception units 32a, 32b and 32c, for example, within a light signal reaching range 35. Thus, there is raised a problem of signal interference or obstruction of communication. In addition, the electric power is consumed wastefully. If the light emission intensity of the light emitting element of the transmission/reception unit 31 is adjusted to a necessary minimum value based on the light reception intensity information from the transmission/reception unit 32a, it may be said that only the transmission/reception unit 32a is present within the light signal reaching range 34, so that there is little risk of the transmission/reception unit obstructing other light communication operations going on in the near-by area, while the power consumption is reduced to a necessary minimum value. This is particularly desirable in the case of a battery-driven type portable reception device in prolonging the battery service life.

Figure 3:
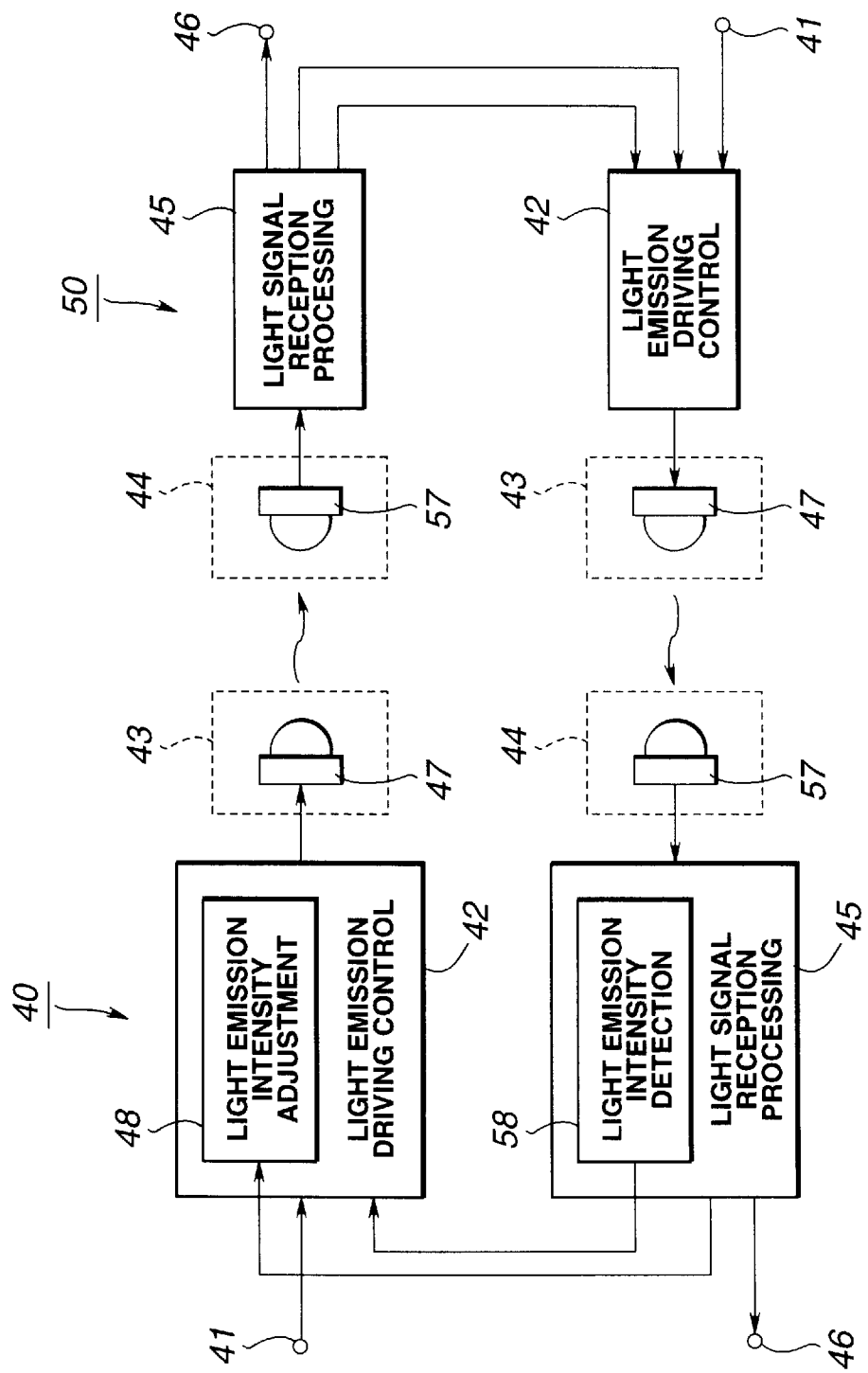
FIG. 3 schematically illustrates a light communication system according to another embodiment of the present invention.

FIG.3 shows an instance of a light communication system employing two transmission/reception units for bi-directional spatial light communication, in which light emission means and light reception means are used for transmission and reception units.

Referring to FIG.3, communication signals supplied to an input terminal 41 of a first transmission/reception unit 40 are sent to a light emission driving control circuit 42. This light emission driving control circuit 42 controls a light receiving element 47 provided in a transmission portion 43 as to light emission responsive to the communication signal. A light receiving element 57 in a receiving portion 44 receives the light of spatial light communication from outside, such as infrared rays, and sends the received light to a light signal reception processing circuit 45. The light signal reception processing circuit 45 performs reception processing on the light signal from the light receiving element 57 and sends the received signal to an output terminal 46. The light signal reception processing circuit 45 also detects the reception light intensity by a reception light intensity detection circuit 58 and sends the detected light intensity to the light emission driving control circuit 42 as the reception light intensity information. The reception light intensity information is sent by the light emission element 47 of the transmission portion 43 as light signal along with the communication signal from the input terminal 41. The reception light intensity signal contained in the light signal supplied from outside is taken out by the light signal reception processing circuit 45 and thence supplied to the light intensity adjustment circuit 48 in the light emission driving control circuit 42. The light intensity adjustment circuit 48 is responsive to the reception light intensity information in the reception light signal to adjust the light emission intensity of the light emission element 47 of the transmission portion 43 to an optimum value.

In FIG.3, a second transmission/reception unit 50 is configured similarly to the first transmission/reception unit 40. Therefore, the corresponding parts are denoted by the same reference numerals, and the corresponding description is omitted for simplicity.

For spatial light communication between these first and second transmission/reception apparatus 40, 50, the light intensity information, specifying the intensity of light received by the light receiving element 57 of the second transmission/reception device 50, as a counterpart of communication, is sent as part of the light signal from the light emitting element 47 of the second transmission/reception device 50 to the light receiving element 57 of the first transmission./reception unit 40, and taken out as the reception light intensity information by the light signal reception processing circuit 45 of the first transmission/reception device 40 so as to be thence supplied to the light intensity adjustment circuit 48 of the light emission driving control circuit 42 where the light emission intensity of the light emitting element 47 of the first transmission/reception unit 40 is adjusted to an optimum value. Similarly, the reception light intensity of the light reception element 57 of the first transmission/reception unit 40 is sent as part of the light signal from the first transmission/reception unit 40 to the second transmission/reception unit 50 for adjusting the light emission intensity of the light emission element 47 of the second transmission/reception unit 50 to an optimum value.

An illustrative method for optimizing adjustment of the light emission intensity is explained with reference to the first transmission/reception unit 40. Using the light intensity adjustment circuit 48 of the first transmission/reception unit 40, the light emission intensity of the light emission element 47 is gradually lowered at the time of starting the communication from the maximum light emission intensity value. As the concomitantly changed reception light intensity at the second transmission/reception unit 50 is checked, the lowering of the light emission intensity is stopped at a value corresponding to the minimum light reception intensity capable of maintaining stable communication. The driving current, for example, is set for maintaining the light emission intensity of the light emission element 47. The light emission intensity adjustment with the second transmission/reception unit 50 may be performed in a similar manner.

The present invention is not limited to the instance of lowering the light emission intensity from its maximum value on starting the communication. For example, light emission is allowed to occur at a minimum light emission intensity on starting the communication, and the light reception intensity of the counterpart of communication is monitored, as the light emission intensity is increased, for adjusting the light emission intensity to an optimum value. Alternatively, light emission is allowed to occur at a moderate light emission intensity between the maximum light emission intensity and the minimum light emission intensity on starting the communication and the light reception intensity of the counterpart of communication is monitored and checked in order to make a decision whether the intensity should be increased or decreased for adjusting the light emission intensity to an optimum value.

In the embodiment, shown in FIG.3, since bi-directional spatial light communication is carried out between the first transmission/reception unit 40 and the second transmission/reception unit 50, communication by electrical waves becomes unnecessary such that bi-directional communication may be achieved solely by light communication. Such communication is high in the degree of freedom because of a smaller amount of regulations than in communication by electrical waves, while being superior in data security since transmission/reception occurs only in a range of view of the communicating parties and hence there is no risk of signal leakage to outside. In addition, the transmission/reception unit may be constructed at a lower cost than in the case of communication by electrical waves.

Moreover, it is possible to produce desirable effects similar to those of the embodiment shown in FIG. 1, such that spatial light communication may be had with the minimum energy required for transmission, while interference with or obstruction of other spatial light communication neighboring to the spatial light communication under consideration may be minimized, so that a larger number of spatial light communication operations can be carried out without interference within a limited spatial area.

The present invention is not limited to the above-described embodiments. For example, although the light emitting element of the transmission unit and the light receiving element of the reception unit are constructed separately from each other, these may be constructed using an integrated light transmitting/light receiving optical unit.

Figure 4:
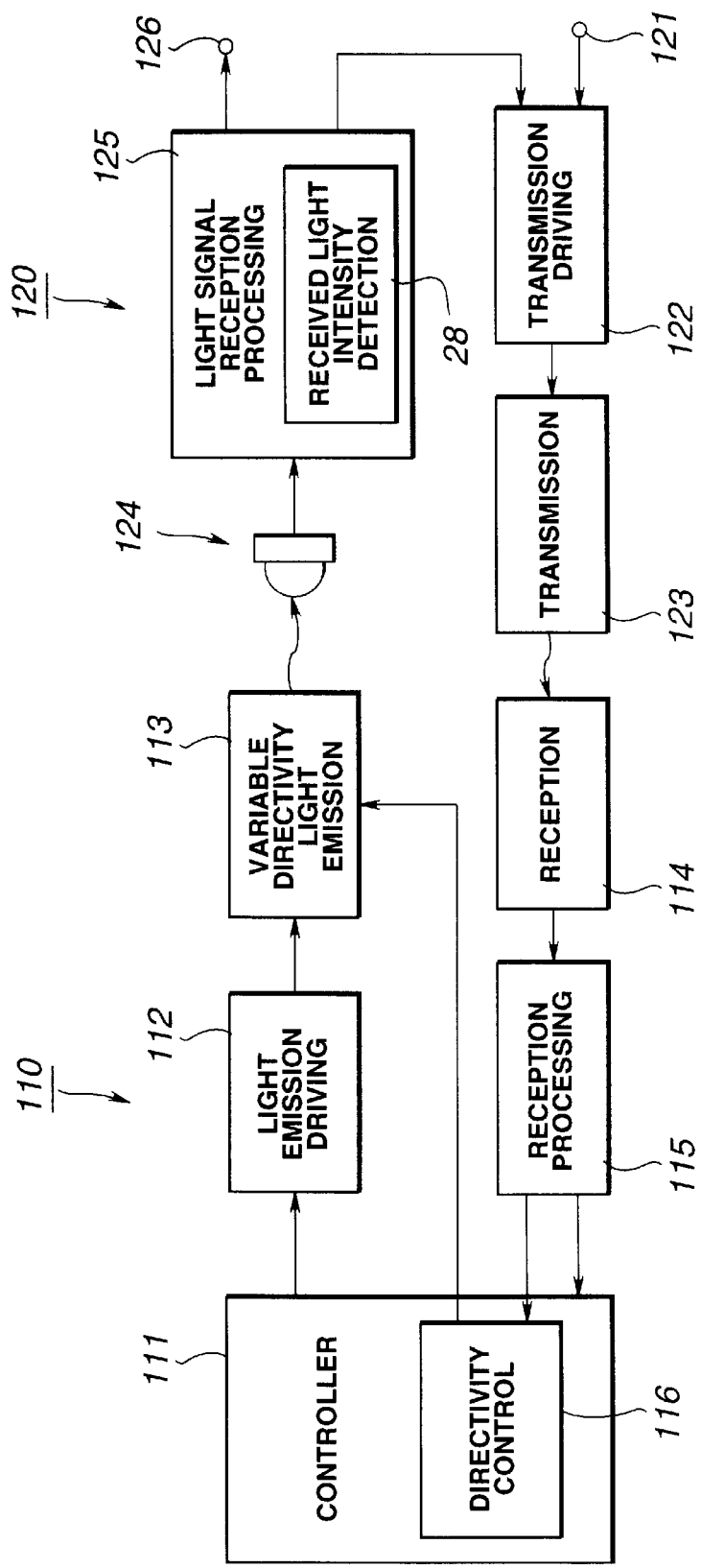
FIG. 4 schematically illustrates a light communication system according to still another embodiment of the present invention.

FIG.4 shows, in a schematic block diagram, another embodiment of the light communication system according to the present invention.

Referring to FIG.4, a first transmission/reception unit 110 for spatial light communication includes a controller 111, a variable directivity driving circuit 112 fed with communication signals supplied via the controller 111 and a variable directivity light emission unit 113 driven for light emission by the light emitting driving circuit 112. The first transmission/reception unit 110 also includes a reception unit 114 for receiving a signal and a reception processing circuit 115 for reception processing the signal from the reception unit 114. The reception processing circuit 115 outputs a reception signal and the reception light intensity information as later explained and routes the reception signal and the reception light intensity information to the controller 111. In particular, the reception light intensity information is sent to the directivity controller 116 within the controller 111. The directivity controller 116 controls the directivity of the outgoing light of the variable directivity light emission unit 113. In many cases, the directivity controller 116 is implemented as software by a CPU within the controller 111.

A second transmission/reception unit 120, as a counterpart of the communication of spatial light communication with respect to the first transmission/reception unit 110, includes a transmission driving circuit 122 for transmission driving control of communication signals supplied to an input terminal 121, a transmission driving circuit 122 for transmission driving control of the communication signal supplied to the input terminal 121, and a transmission unit 123 supplied with the signal from the transmission driving circuit 122. The second transmission/reception unit 120 also a light reception unit 124 for receiving the light signal from the variable directivity light emission unit 113 from the first transmission/reception unit 110 and a light signal reception processing circuit 125 for reception processing the signal from the light reception unit 124. The reception signal from the light signal reception processing circuit 125 is taken out via an output terminal 126. Within the light signal reception processing circuit 125 is provided a reception light intensity detection circuit 128 for detecting the intensity of the light received by the light reception unit 124. The reception light intensity information detected by the reception light intensity detection circuit 128 is sent to the transmission driving coaret 122 and thence supplied along with the communication signal from the input terminal 121 to the transmission unit 123 as the transmission driving signal. The transmission unit 123 transmits electrical waves, infrared rays or other signals to the reception unit 114 of the first transmission/reception unit 110. The communication between the transmission unit 123 of the second transmission/reception unit 120 and the light reception unit 114 of the first transmission/reception unit 110 may be by electrical waves, infrared rays or the like. Of these, spatial light communication by infrared rays is most preferred. Of the reception information obtained on reception by the reception unit 114 of the first transmission/reception unit 110 and reception processing by the reception processing circuit 115, the reception light intensity information is sent to the directivity controller 116 in the controller 111.

The directivity controller 116 in the first transmission/reception unit 110 monitors the reception light intensity in the second transmission/reception unit 120, while changing the directivity of the variable directivity light emission unit 113 at the time of staring the communication, in order to find directivity which maximizes the light reception intensity. After setting the variable directivity light emission unit 113 to the optimum directivity which maximizes the reception light intensity, spatial light communication of inherent communication signals is carried out. If the relative positioning of the first transmission/reception unit 110 and the second transmission/reception unit 120 is fixed, it suffices to set the directivity to an optimum state at the outset, it being unnecessary to adjust and set directivity each time communication is started.

Figure 5:
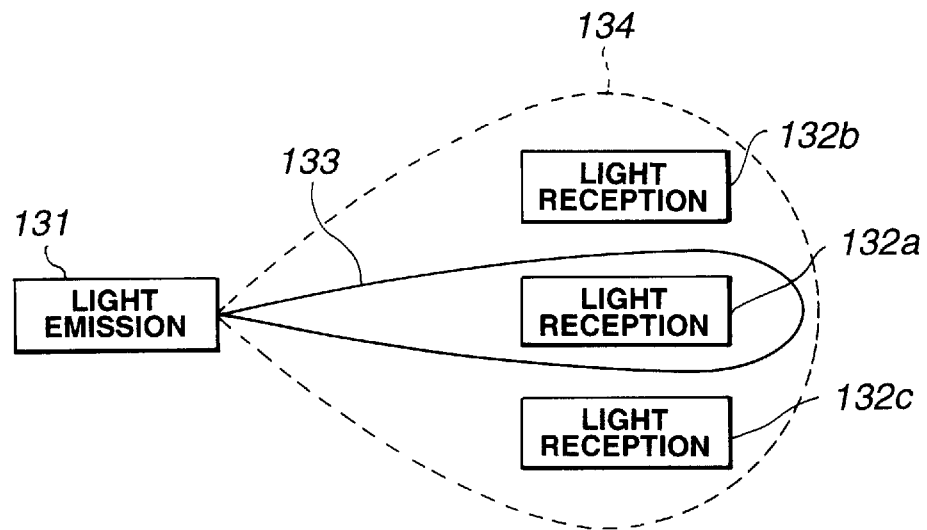
FIG. 5 illustrates the signal reaching range in spatial light communication dependent on directivity.

Such adjustment of light emission intensity has the following merits:

If communication is to be had between a transmission/reception unit 131 having the light emission element for transmission and a transmission/reception unit 132*a* having a light reception element, and the directivity of the light emission element of the transmission/reception unit 131 is set to a broader value, there are three transmission/reception units 132*a*, 132*b* and 132*c*, for example, within a light signal reaching range 134, so that there is raised a problem of signal interference or obstruction of communication. In addition, the electric power is consumed wastefully. If directivity of the light emitting element of the transmission/reception unit 131 is changed on the basis of the light reception intensity information from the transmission/reception unit 132*a*, so that directivity is such as will give a light signal reaching range 133 shown in FIG.5, it may be said that only the transmission/reception unit 132*a* is present within the light signal reaching range 134, so that there is little risk of the transmission/reception unit obstructing other light communication operations proceeding in the near-by area, while the power consumption is reduced to a necessary minimum value.

Figure 6:
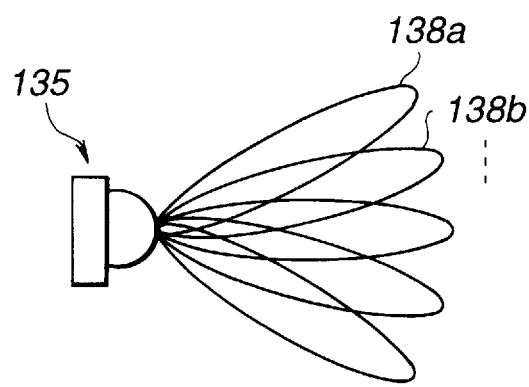
FIG. 6 illustrates a specific example of directivity of the light emission portion with variable directivity.

Referring to changing the directivity of the variable directivity light emission unit, it is more preferred to switch between narrow directivities of different directions as shown in FIG.6 than changing the breadth, such as changing from broad directivity to narrow directivity and vice versa. That is, in FIG.6, the variable directivity light emission unit 135 has a plurality of narrower directivities 138*a*, 138*b*, . . . having different directions. The variable directivity light emission unit 135 has its directivity changed by selectively switching between these directivities 138*a*, 138*b*, . . .

Figure 7:
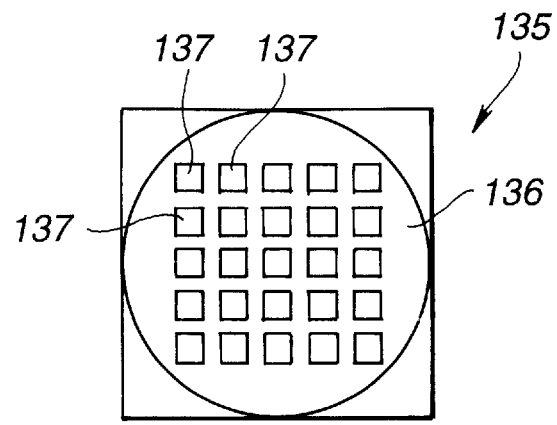
FIG. 7 is a schematic front view showing a variable directivity light emitting unit.
Figure 8:
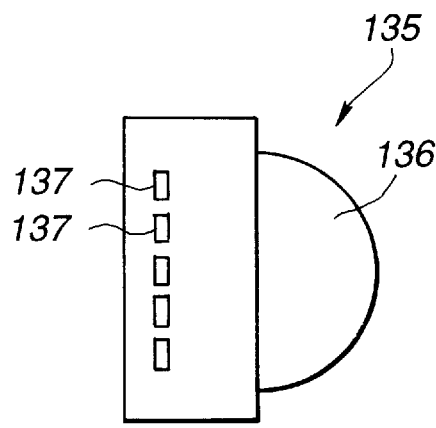
FIG. 8 is a schematic side view showing a variable directivity light emitting unit.

Referring to FIGS. 7 and 8, an illustrative structure of the variable directivity light emission unit 135 is explained.

In these figures, a unitary lens 136 is provided on a matrix array of plural light emitting elements 137 so that the light emitting elements 137 will have directivities of different directions for constituting a variable directivity light emitting unit 135. In the present illustrative example, 5 5=25 infrared light emitting diodes are arrayed as light emitting elements 137 in a matrix configuration, with the light emitting elements 137 being narrower in directivity, with the half-value angle being on the order of 5 degrees. Thus the interference or obstruction affecting neighboring spatial light communication routes becomes extremely small thus enabling a larger number of communication operations to be performed simultaneously within a limited space. The half value angle of the directivity of the variable directivity light emission unit 135 on the order of 25 degrees may be achieved. The transmission/reception unit having such variable directivity light emission unit 135 may be installed easily without the necessity of performing correct positioning. Moreover, since only one of the 25 light emitting elements is selected for light emission, the energy required for light emission may be reduced to about 1/25 of that required with the conventional system.

If the above-described variable directivity light emission unit 135 is used as the variable directivity light emission unit 113 of the first transmission/reception unit 110 of FIG.4, a reference signal is first transmitted, whilst the directivity controller 116 of the controller 111 of FIG.4 switches between the light emitting elements 137, and the light reception intensities at the second transmission/reception unit 120 of the counterpart of communication shown in FIG.4 are compared in association with the selected light emission elements 137 for selecting the light emitting element having the maximum light reception intensity. As a matter of fact, the selected light emission element has directivity matched to the direction along which is situated the second transmission/reception unit 120 of the counterpart of communication shown in FIG.4.

Therefore, the spatial light communication system of FIG.4 employing the variable directivity light emitting unit 135 shown in FIGS. 7 and 8 has a comprehensive directivity which is not deleterious to positioning of the first transmission/reception unit 110 and the second transmission/reception unit 120 at the time of installation. For spatial light communication, only the directivity that is necessary may be used for reducing power consumption as well as interference or obstruction possibly affecting other spatial light communication operations.

Several illustrative examples of switching selection methods of plural light emission elements 137 of the variable directivity light emission units 135 shown in FIGS. 7 and 8 will now be explained.

The first method is to sequentially scan the light emitting elements 137 in their entirety and to select such a light emission elements as will give the maximum light emission intensity on the light receiving side.

In this case, the light emission elements 137 are scanned by the directivity controller 116 of the controller 111 of the transmission/reception unit 110 of FIG.4 in a pre-set sequence. For example, the light emitting elements 137 of the uppermost row in FIG.7 are transversely scanned beginning from the upper left corner light emitting element to the right end light emitting element. The scanning then proceeds to the lest end of the second upper row so that the light emitting elements 137 of the second upper row are then scanned transversely in the similar manner as far as the right corner The scanning then shifts to the left hand end of the second upper row. This sequence of operations is repeated up to the right lower corner light emitting element for transmitting a pre-set signal. The reception light intensities of the counterpart of communication, as detected by the second transmission/reception unit 120 of FIG.4, is compared for each of the light emitting elements 137, thus selected by switched scanning, by the directivity controller 116 of the controller 111 of the first transmission/reception unit 110, and such light emitting element as has the maximum reception light intensity is selected.

It may be envisaged to transmit a signal having a code of the selectively switched light emitting element, for example, an element number, in the course of scanning of the entire elements, so that the second transmission/reception unit 120 of the counterpart of communication will be able to specify which of the light emitting elements has been selected by switched scanning. In such case, the second transmission/reception unit 120 associatively stores the element numbers of the light emitting elements and the corresponding light reception intensities and compares the light reception intensities for detecting the maximum light reception intensity for returning the element number associated with this maximum light reception intensity to the first transmission/reception unit 110.

Such detection of the maximum light reception intensity may be achieved by storing a set of the element number and the light reception intensity for the light emitting element scanned first in a memory, comparing the light reception intensity of the light emitting element scanned next to the light reception intensity stored in the memory, and by storing a larger one of the first and second sets in the memory. This sequence of operations is repeated until the end of scanning. The reception intensity of the set of the element number and the reception light intensity left in the memory at the end of scanning corresponds to the maximum reception light intensity. Such detection of the maximum reception light intensity may be performed in a similar manner by the first transmission/reception unit 110. The second method is to scan the light emitting elements 137 on the block basis in order to select such a light emission element as will give the maximum light emission intensity on the light receiving side.

In such case, the light emitting elements 37 of the 5 5 matrix shown in FIG.7 are blocked in terms of five light emitting elements of each column and are scanned from column to column. In this manner, the column with the maximum reception light intensity is selected. The five light emitting elements 137 in the selected column are then sequentially scanned. By so doing, it is only necessary to perform ten switching operations, namely switching of five columns and switching of five elements in the selected column, thus enabling shortening the time required in selecting the element with the maximum light emission intensity. In such case, detection of the maximum light emission intensity may be done on the side of the first transmission/reception unit 110 or the second transmission/reception unit 120, whichever is desired.

The third method for switching selection is now explained. With the third method, three light emission elements not lying on the same straight line are sequentially switched for light emission and the resulting three reception light intensities are compared to one another. In such case, the number of the light reception elements which will give the maximum reception light intensity is limited to four. If the light receiving side unit is within a prescribed angular range, the sole element may be specified, thus enabling shortening the time required for selection.

There may be envisaged a variety of methods for switching selection other than those described above.

In the above description, spatial light communication is employed for at least the unidirectional communication between a pair of transmission/reception units. However, spatial light communication may also be employed for the bi-directional communication. An illustrative embodiment for the case is now explained by referring to FIG.9.

Figure 9:
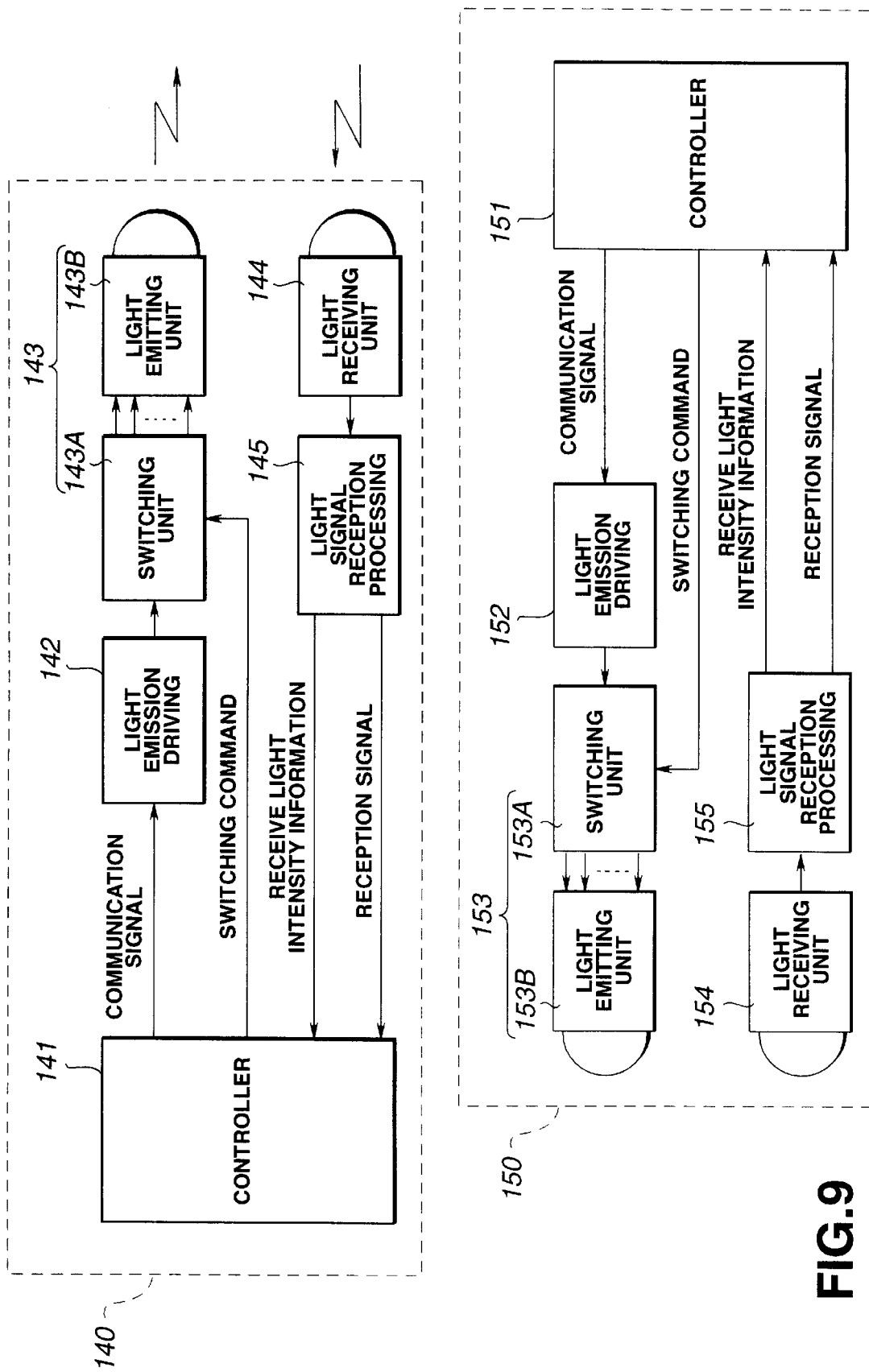
FIG. 9 schematically illustrates a light communication system according to yet another embodiment of the present invention.

In FIG.9, a first transmission/reception unit 140 and a second transmission/reception unit 150 are configured similarly to each other. The components of the first transmission/reception unit 140 are denoted by 140ies of reference numerals, while the components of the second transmission/reception unit 150 are denoted by 150ies of reference numerals.

The first transmission/reception unit 140 of FIG.9 includes a controller 141, a light emission driving circuit 142 to which is entered a communication signal supplied via the controller 141, and a variable directivity light emitting unit 143 driven for light emission by the light emission driving circuit 142. The first transmission/reception unit 140 also includes a light reception unit 144 for receiving the light signal and a light signal reception processing circuit 145 for reception processing the light signal from the light reception unit 144. The variable directivity light emission unit 143 is made up of a light emitting portion 143B having plural light emitting elements having different directivities and a switching portion 143A for switching the light emitting elements of the light emitting portion 143B. The reception processing circuit 145 outputs the reception signal and the reception light intensity information at the light receiving portion 144 to the controller 141. The reception light intensity information at the second transmission/reception unit 150 or the information on the element number with the maximum reception light intensity may be contained in the reception signal. The controller 141 outputs a switching command signal for performing the above-described scanning or a switching command signal for switching to the directivity associated with the maximum reception light intensity and sends the output signal to the switching portion 143A of the variable directivity light emission unit 143.

The second transmission/reception unit 150, as a counterpart of communication of spatial light transmission for the first transmission/reception unit 140, is configured similarly to the first transmission/reception unit 140. Thus the components of the second transmission/reception unit 150 are denoted by 150ies of reference numerals, in substitution for the 140ies of reference numerals for the first transmission/reception unit 140, and the corresponding description is omitted for simplicity.

The bi-directional spatial light communication is carried out as shown in FIG.9 and both the directivity switching control and reception light intensity detection are carried out in the units 140 and 150 for selecting the optimum light emitting elements by both units 140, 150, before proceeding to the communication of the desired signals.

The present invention is not limited to the embodiments described above. For example, in the variable directivity light emission unit of FIGS. 7 and 8, the unitary lens is used for affording different directivities to the light emitting elements. However, the light emitting elements may be mounted at different mounting angles for providing the different directivities. Although the light-emitting elements are arrayed in a 5 5 matrix configuration, two or more light emitting elements may be arrayed in an arbitrary configuration, such as in a linear configuration. The half-value angles of directivities of the light emitting elements is not limited to 5 degrees, but may be an arbitrary angle. Moreover, although the light emitting and light receiving units are designed as separate units, it is also possible to use a unitary transmitting/receiving optical component.

I claim:

1. An optical communication system comprising:
    first transmitting and receiving circuitry and second transmitting and receiving circuitry, said first transmitting and receiving circuitry comprising:
        a first transmitter portion having a first optical emitter;
        a first receiving portion for receiving a transmission from said second transmitting and receiving circuitry;
        adjustment circuitry for adjusting an optical emission intensity of an optical light emitted from said first optical emitter to said second transmitting and receiving circuitry; and
    said second transmitting and receiving circuitry comprising:
        a second receiving portion having a second optical receiver;
        an optical intensity detector for detecting an optical intensity of an optical light received from said first transmitting and receiving circuitry at said second optical receiver;
        a second transmitting portion coupled to said second receiving portion for transmitting information of optical intensity detected by said optical intensity detector to said first transmitting and receiving circuitry;
        wherein said adjustment circuitry adjusts said optical intensity emitted from said first optical emitter to said first transmitting and receiving circuitry in relation to said information of said optical intensity detected by said optical intensity detector.

2. An optical communication system according to claim 1, wherein said first receiving portion of said first transmitting and receiving circuitry includes first optical receiving circuitry.

3. An optical communication system according to claim 1, wherein said second transmitting portion of said second transmitting and receiving circuitry includes feedback circuitry to said adjustment circuitry to transmit a signal derived from said optical intensity detector.

4. An optical communication system according to claim 1, wherein said adjustment circuitry controls said first optical emitter so that said first optical emitter emits said optical light at a minimum emitting intensity to said second optical receiver of said second transmitting and receiving circuitry.

5. An optical communication system according to claim 1, wherein said second transmitting portion includes transmission control circuitry for control of an external communication signal.

6. An optical communication system according to claim 5, further comprising reception processing circuitry coupled to said transmission control circuitry for processing of a signal derived from said optical intensity detector and said external communication signal.

7. An optical communication system comprising:
    first transmitting and receiving circuitry and second transmitting and receiving circuitry, said first transmitting and receiving circuitry comprising:
        a first transmitting portion having a first optical emitter directivity variable;
        a first receiving portion for receiving a transmission from said second transmitting and receiving circuitry;
        directivity control circuitry for controlling said directivity of said first optical emitter to said second transmitting and receiving circuitry; and
    said second transmitting and receiving circuitry comprising:
        a second receiving portion having a second optical receiver;
        an optical intensity detector for detecting an optical intensity of an optical light received from said first transmitting and receiving circuitry at said second optical receiver;
        a second transmitting portion for transmitting to said first transmitting and receiving circuitry information related to said optical intensity detected by said optical intensity detector;
    wherein said directivity control circuitry controls said directivity of said first optical emitter in relation to said information of said optical intensity detected by said optical intensity detector.

8. An optical communication system according to claim 7, wherein said first receiving portion of said first transmitting and receiving circuitry includes a-first optical receiving circuitry.

9. An optical communication system according to claim 7, wherein said second transmitting portion of said second transmitting and receiving circuitry includes feedback circuitry to said adjustment circuitry to transmit a signal derived from said optical intensity detector.

10. An optical communication system according to claim 7, wherein said directivity control circuitry controls said directivity of said first optical emitter so that said optical intensity of said optical light received at said second optical receiver becomes maximum.

11. An optical communication system according to claim 7, wherein said first optical emitter comprises a plurality of optical emitting devices each having a directivity that is different from the directivity of the other optical emitting devices, and wherein said directivity is changed by switching said plurality of optical emitting devices.

12. An optical communication system according to claim 11, wherein said plurality of optical emitting devices are switched to select one of said plurality of optical emitting devices so that said optical intensity of said optical light received at said second optical receiver becomes maximum.

13. An optical communication system according to claim 7, wherein said second transmitting portion includes transmission control circuitry for control of an external communication signal.

14. An optical communication system according to claim 13, further comprising reception processing circuitry coupled to said transmission control circuitry for processing of a signal derived from said optical intensity detector and said external communication signal.

* * * * *